(12) United States Patent
Shimada

(10) Patent No.: US 8,878,939 B2
(45) Date of Patent: Nov. 4, 2014

(54) APPARATUS AND METHOD FOR SUBJECT TRACKING, AND RECORDING MEDIUM STORING PROGRAM THEREOF

(75) Inventor: Keisuke Shimada, Hamura (JP)

(73) Assignee: Casio Computer Co., Ltd., Tokyo (JP)

( * ) Notice: Subject to any disclaimer, the term of this patent is extended or adjusted under 35 U.S.C. 154(b) by 276 days.

(21) Appl. No.: 13/104,231

(22) Filed: May 10, 2011

(65) Prior Publication Data

US 2011/0273571 A1 Nov. 10, 2011

(30) Foreign Application Priority Data

May 10, 2010 (JP) .................................. 2010-107928
Feb. 22, 2011 (JP) .................................. 2011-035595

(51) Int. Cl.
| | | |
|---|---|---|
| *H04N 5/225* | (2006.01) | |
| *H04N 5/232* | (2006.01) | |
| *G01S 3/786* | (2006.01) | |
| *G06K 9/00* | (2006.01) | |
| *G06T 7/20* | (2006.01) | |
| *H04N 7/18* | (2006.01) | |
| *G01B 11/02* | (2006.01) | |

(52) U.S. Cl.
CPC .......... *H04N 5/23212* (2013.01); *G01S 3/7864* (2013.01); *H04N 7/181* (2013.01); *G01B 11/022* (2013.01); *G06K 9/00261* (2013.01); *G06T 7/204* (2013.01); *G06T 2207/20021* (2013.01); *G06T 2207/30201* (2013.01); *H04N 5/23219* (2013.01)
USPC .............................. 348/169; 348/143; 348/135

(58) Field of Classification Search
USPC .......................................... 348/169, 143, 135
IPC ........ G01S 3/7864; H04N 7/181; G01B 11/022
See application file for complete search history.

(56) References Cited

U.S. PATENT DOCUMENTS

| 6,108,033 A | 8/2000 | Ito et al. |
| 7,796,161 B2 * | 9/2010 | Oya .......................... 348/211.6 |

(Continued)

FOREIGN PATENT DOCUMENTS

| CN | 1556506 A | 12/2004 |
| CN | 1738426 A | 2/2006 |

(Continued)

OTHER PUBLICATIONS

Chinese Office Action dated Mar. 29, 2013 (and English translation thereof) in counterpart Chinese Application No. 201110122343.1.

(Continued)

*Primary Examiner* — Shawn An
(74) *Attorney, Agent, or Firm* — Holtz, Holtz, Goodman & Chick PC

(57) ABSTRACT

A subject tracking apparatus, including: a storage section that stores image data of a subject; a division section that divides the image data of the subject into a plurality of first areas; an imaging section that sequentially generates image frames; a specification section that specifies a second area similar to one of the first areas, the second area being included in each of the image frames sequentially generated, based on a characteristic value of one of the first areas into which the image data of the subject is divided by the division section; and a tracking section that tracks an image area as the subject in each of the image frames sequentially generated, wherein the image area is determined based on the second area specified by the specification section.

12 Claims, 10 Drawing Sheets

(56) References Cited

U.S. PATENT DOCUMENTS

| | | | |
|---|---|---|---|
| 8,116,525 B2* | 2/2012 | Guo et al. | 382/103 |
| 8,615,106 B2* | 12/2013 | Wedge | 382/103 |
| 2004/0017930 A1* | 1/2004 | Kim et al. | 382/103 |
| 2009/0244315 A1* | 10/2009 | Miura et al. | 348/222.1 |
| 2009/0290791 A1 | 11/2009 | Holub et al. | |

FOREIGN PATENT DOCUMENTS

| | | | | |
|---|---|---|---|---|
| CN | 1892702 A | | 1/2007 | |
| JP | 8-167022 | * | 6/1996 | G06T 1/00 |
| JP | 8-167022 A | | 6/1996 | |
| JP | 09-322155 A | | 12/1997 | |
| JP | 2004-171490 A | | 6/2004 | |
| JP | 2008-028747 A | | 2/2008 | |
| JP | 2008-028890 A | | 2/2008 | |
| JP | 2010-028370 A | | 2/2010 | |
| WO | WO 2009/143279 A1 | | 11/2009 | |

OTHER PUBLICATIONS

Japanese Office Action dated Mar. 11, 2014 (and English translation thereof) in counterpart Japanese Application No. 2011-035595.

* cited by examiner

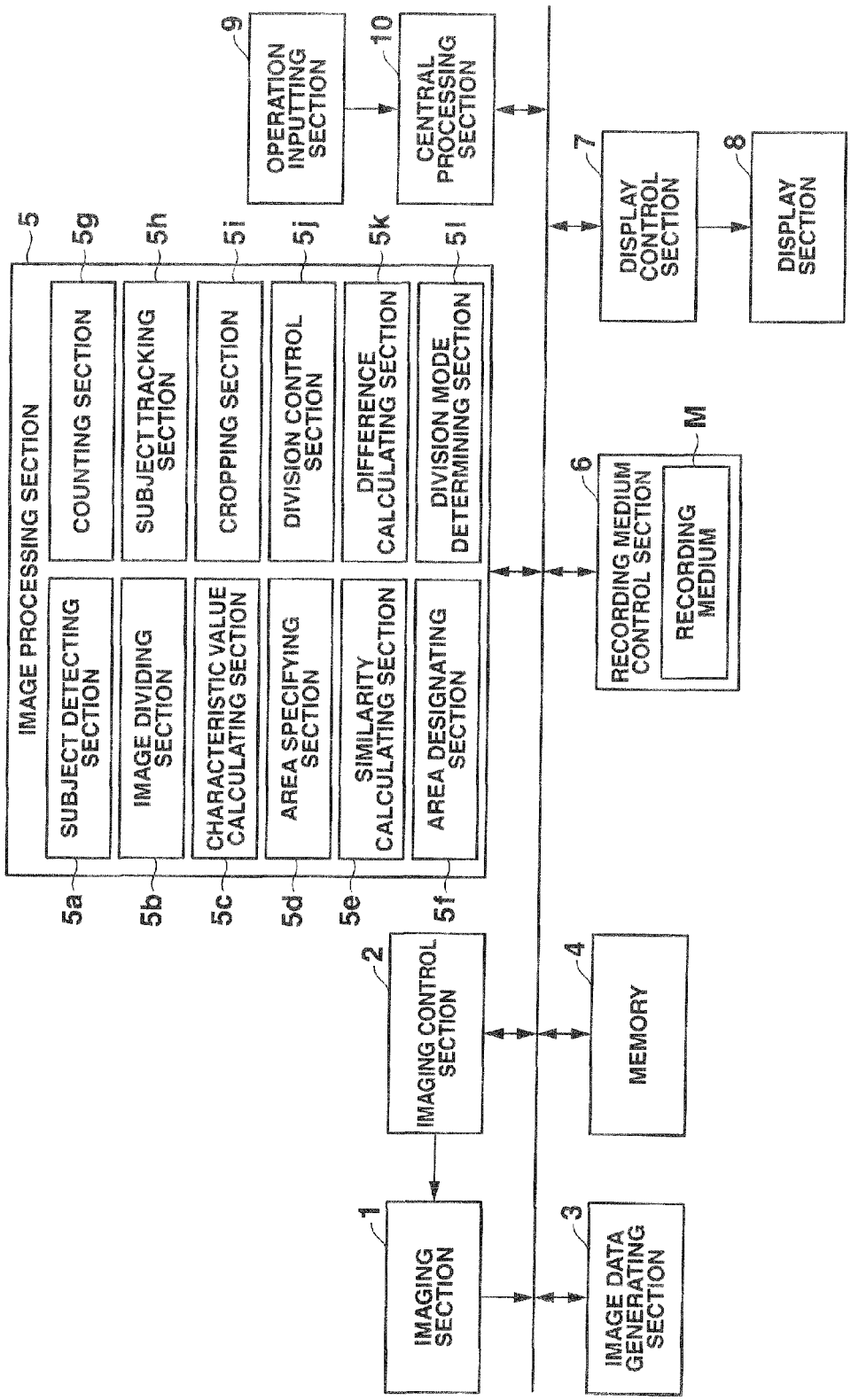

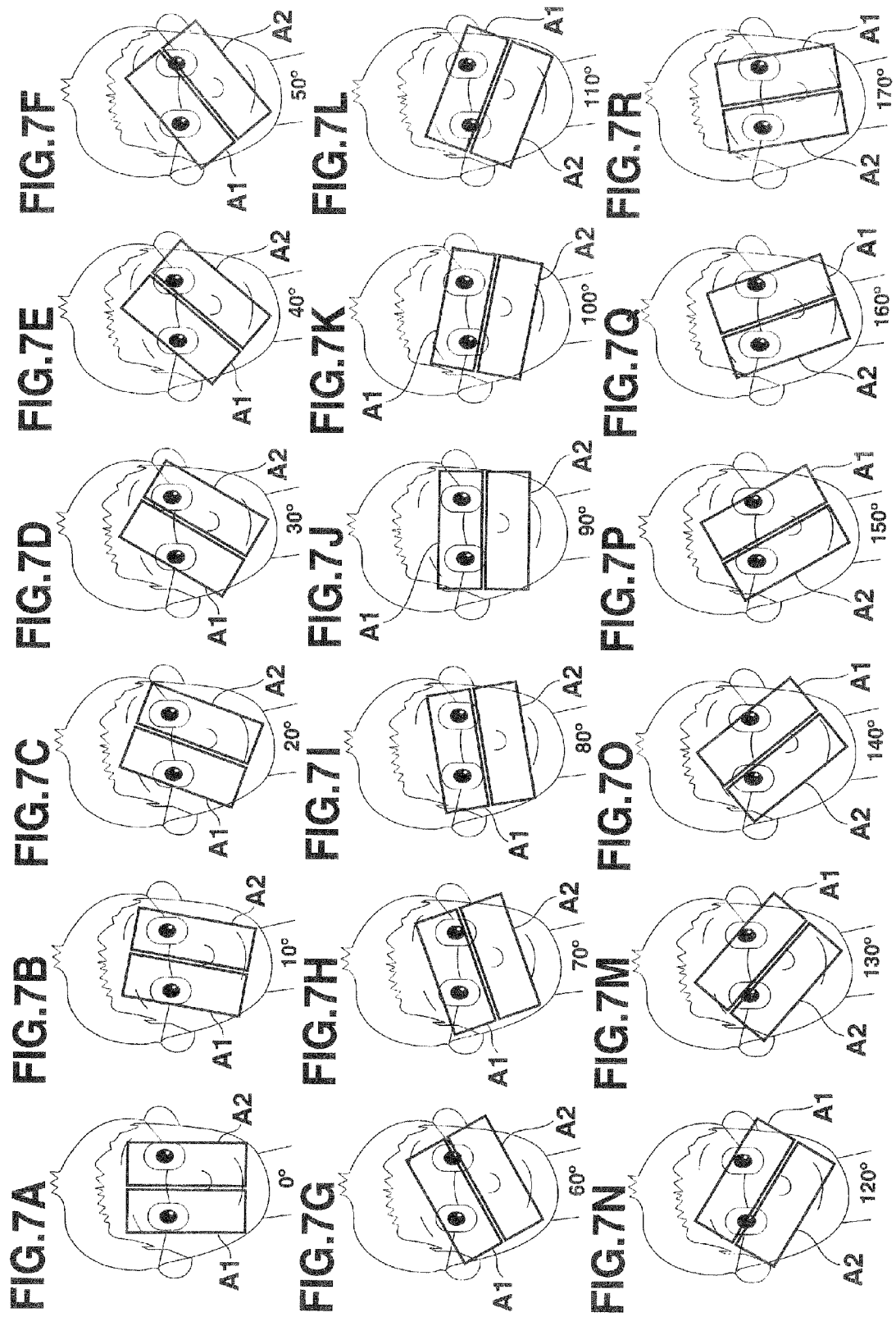

APPARATUS AND METHOD FOR SUBJECT TRACKING, AND RECORDING MEDIUM STORING PROGRAM THEREOF

BACKGROUND OF THE INVENTION

1. Field of the Invention

The present invention relates to an apparatus and a method for subject tracking among a plurality of images, and a recording medium storing the program for the subject tracking.

2. Description of Related Art

With respect to the technique of detecting a subject, such as a face, by template matching, Japanese Patent Application Laid-Open Publication No. 2004-171490 discloses a technique for reducing the operation quantity for subject detection, at the time of detecting a subject, by searching the vicinity of the position of the subject which is successfully detected at the last time.

The technique disclosed in Japanese Patent Application Laid-Open Publication No. 2004-171490 is based on an assumption that changes of a position of a face, i.e. a subject, in the angle of view are not large. The technique, however, has a problem in which the accuracy of subject detection is reduced when a subject turns to another way in an angle of view—for example, when a face turns around, turns up, or the like—and it becomes impossible to appropriately track the subject among a plurality of images.

SUMMARY OF THE INVENTION

Therefore, it is an object of the present invention to provide an apparatus and a method for subject tracking and a recording medium storing the program for the subject tracking capable of improving accuracy in tracking a subject.

According to a first aspect of the present invention, there is provided a subject tracking apparatus, including: a storage section that stores image data of a subject; a division section that divides the image data of the subject into a plurality of first areas; an imaging section that sequentially generates image frames; a specification section that specifies a second area similar to one of the first areas, the second area being included in each of the image frames sequentially generated by the imaging section, based on a characteristic value of one of the first areas into which the image data of the subject is divided by the division section; and a tracking section that tracks an image area as the subject in each of the image frames sequentially generated, wherein the image area is determined based on the second area specified by the specification section.

According to a second aspect of the present invention, there is provided a method for tracking a subject, the method using a subject tracking apparatus including a storage section that stores image data of the subject, the method including the steps of: dividing the image data of the subject into a plurality of first areas; sequentially generating image frames; specifying a second area similar to one of the first areas, the second area being included in each of the image frames sequentially generated, based on a characteristic value of one of the first areas into which the image data of the subject is divided; and tracking an image area as the subject in each of the image frames sequentially generated, wherein the image area is determined based on the second area specified.

According to a third aspect of the present invention, there is provided a computer-readable recording medium storing a program for a subject tracking apparatus including a storage section that stores image data of a subject, the program enabling the computer to functions as: a division section that divides the image data of the subject into a plurality of first areas; an imaging control section that sequentially generates image frames; a specification section that specifies a second area similar to one of the first areas, the second area being included in each of the image frames sequentially generated, based on a characteristic value of one of the first areas into which the image data of the subject is divided by the division section; and a tracking section that tracks an image area as the subject in each of the image frames sequentially generated, wherein the image area is determined based on the second area specified by the specification section.

BRIEF DESCRIPTION OF THE DRAWINGS

The above and other objects, advantages and features of the present invention will become more fully understood from the detailed description given hereinbelow and the appended drawings which are given byway of illustration only, and thus are not intended as a definition of the limits of the present invention, and wherein:

FIG. 6 is a block diagram showing the schematic configuration of an imaging apparatus of a second embodiment to which the present invention is applied;

FIGS. 7A, 7B, 7C, 7D, 7E, 7F, 7G, 7H, 7I, 7J, 7K, 7L, 7M, 7N, 7O, 7P, 7Q, and 7R are views schematically showing examples of division modes for image data of a subject by the image apparatus of FIG. 6;

DESCRIPTION OF THE PREFERRED EMBODIMENTS

In the following, concrete embodiments of the present invention are described with reference to the accompanying drawings. However, the scope of the invention is not limited to the shown examples.

[First Embodiment]

Figure 1:
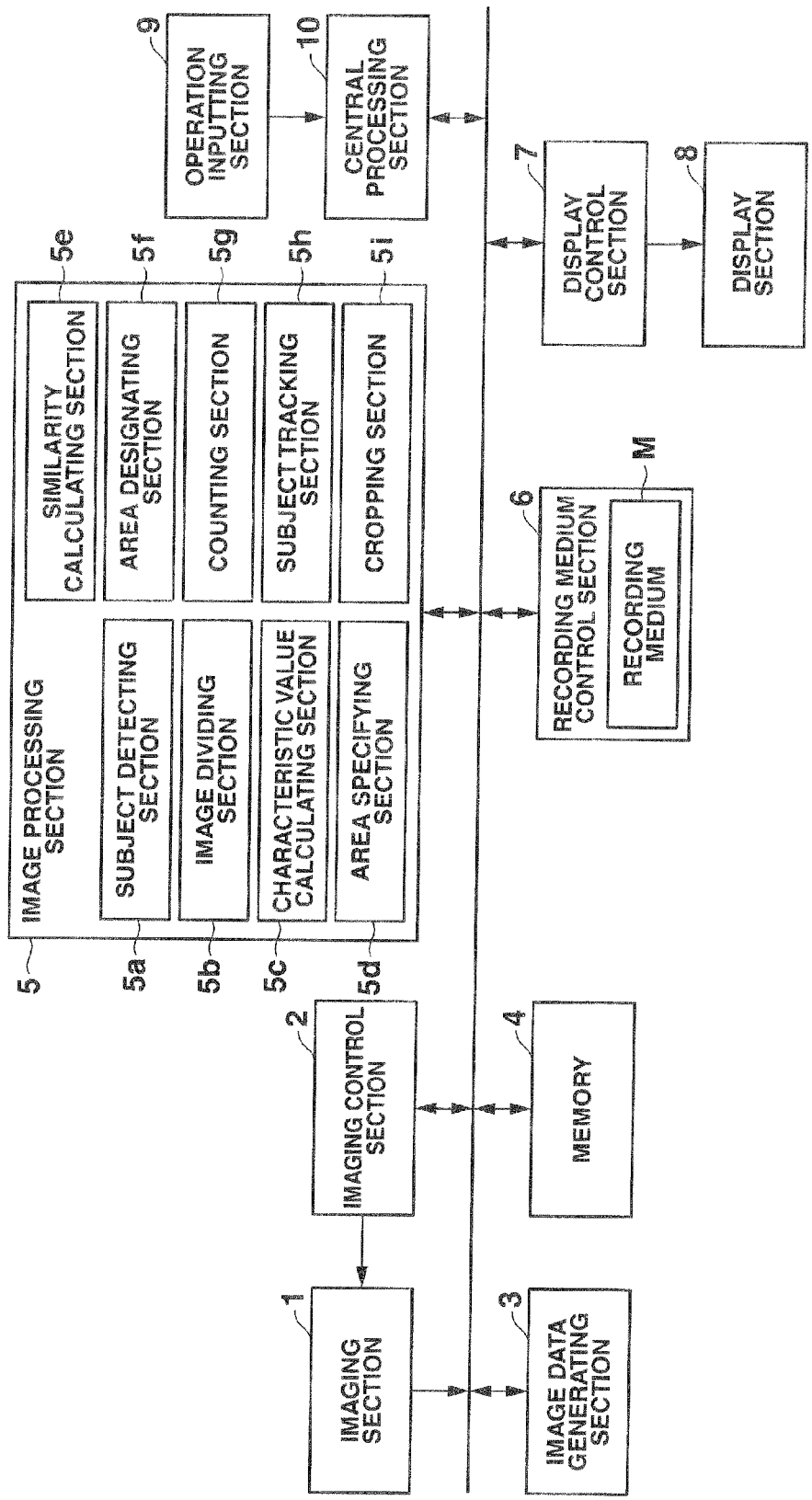
FIG. 1 is a block diagram showing the schematic configuration of an imaging apparatus of a first embodiment to which the present invention is applied.

FIG. 1 is a block diagram showing the schematic configuration of an imaging apparatus 100 of a first embodiment to which the present invention is applied.

The imaging apparatus 100 divides image data of a subject stored in a memory 4 (storage section) into a plurality of areas (first areas). In addition, the imaging apparatus 100 specifies corresponding areas (second areas) similar to one of the first areas, wherein the second areas are included in each of the image frames sequentially generated. Further, the imaging apparatus 100 tracks an image area in each of the image frames sequentially generated, wherein the image area is determined based on the specified second areas.

To put it concretely, as shown in FIG. 1, the imaging apparatus 100 includes an imaging section 1, an imaging control section 2, an image data generating section 3, the memory 4, an image processing section 5, a recording medium control section 6, a display control section 7, a display section 8, an operation inputting section 9, and a central processing section 10.

The imaging section 1, as an imaging section, images a subject (for example, a person's face; see FIG. 5A and the like) and generates an image frame. More specifically, the imaging section 1 includes a lens section composed of a plurality of lenses, such as a zoom lens and a focus lens; an iris diaphragm for adjusting quantity of light passing through the lens section; and an electronic imaging section composed of an image sensor, such as a charge coupled device (CCD) or a complementary metal-oxide semiconductor (CMOS), for converting an optical image having passed through the various lenses in the lens section into a two-dimensional image signal (not shown).

Moreover, the imaging section 1 may include a zoom drive section for moving the zoom lens into the optical axis direction thereof, a focusing drive section for moving the focus lens into the optical axis direction thereof, and the like, for imaging a subject (not shown).

The imaging control section 2 controls imaging of a subject by the imaging section 1. More specifically, the imaging control section 2 includes a timing generator (TG), a driver, and the like (not shown). The imaging control section 2 performs scanning drive of the electronic imaging section with the timing generator and the driver to make the electronic imaging section convert an optical image into a two-dimensional image signal every predetermined period. Then, the imaging control section 2 reads out an image frame screen by screen from the imaging area of the electronic imaging section to output the read-out image frame to the image data generating section 3.

Moreover, the imaging control section 2 controls imaging by the imaging section 1 on the basis of a result of tracking a subject obtained by a subject tracking section 5h (described below) of the image processing section 5.

To put it concretely, the imaging control section 2 controls automatic focusing processing (AF) on the basis of the result of tracking a subject obtained by the subject tracking section 5h. More specifically, when a subject to be tracked by the subject tracking section 5h, i.e. a face area F, which is preliminarily registered, is detected, the imaging control section 2 sets the face area F in each image frame as a focus area by making the focusing drive section of the imaging section 1 move the focus lens into the optical axis direction thereof to adjust the focus position of the focus lens. Moreover, if no face area F which is preliminarily registered is detected, the imaging control section 2 makes the focusing drive section of the imaging section 1 move the focus lens into the optical axis direction thereof to adjust the focus position of the focus lens so as to set an image area as a focus area, wherein the image area is determined based on second areas corresponding to each of two first areas Al and Ar (e.g. left and right areas) into which a face is divided by an image dividing section 5b (described below) in each image frame.

The imaging control section 2 may move the electronic imaging section, instead of the lens section, into the optical axis direction to adjust the focus position of the lens section.

Moreover, the imaging control section 2 may perform controls for adjusting conditions under which a subject is imaged, such as automatic exposure processing (AE) and automatic white balancing (AWB) in addition to the automatic focusing processing (AF).

As described above, the imaging control section 2 controls the imaging section 1 based on a tracking result obtained by the subject tracking section 5h.

The image data generating section 3 suitably performs gain adjustment for each color component of red (R), green (G), and blue (B) of an analog value signal of an image frame transferred from the electronic imaging section, and succeedingly performs sample and hold of the analog value signal with a sample-and-hold circuit (not shown) to convert the analog value signal to digital data with an A/D converter (not shown). Then, the image data generating section 3 performs color process processing including pixel interpolation processing and 7 correction processing with a color process circuit (not shown), to the digital data into which the analog value signal is converted, and succeedingly generates a luminance signal Y and color-difference signals Cb and Cr (YUV data), each having a digital value.

The luminance signal Y and color-difference signals Cb and Cr output from the color process circuit are transferred to the memory 4, which is used as a buffer memory, through a direct memory access (DMA) controller (not shown) in a manner of DMA transfer.

The memory 4 is composed of, for example, a dynamic random access memory (DRAM), and temporarily stores data and the like to be processed by the image processing section 5, the central processing section 10, and the like.

The image processing section 5 includes a subject detecting section 5a, the image dividing section 5b, a characteristic value calculating section 5c, an area specifying section 5d, a similarity calculating section 5e, an area designating section 5f, a counting section 5g, the subject tracking section 5h, and a cropping section 5i.

Though each section of the image processing section 5 is composed of, for example, a predetermined logic circuit, the configuration is merely an example and the configuration of each section is not limited to the above configuration.

The subject detecting section 5a detects a subject (such as a person's face) from an image frame generated by the imaging section 1.

More specifically, the subject detecting section 5a obtains image data (YUV data) of each of the image frames, from the memory 4, wherein the image frames are sequentially generated by imaging of a subject by the imaging section 1. Then, the subject detecting section 5a detects a subject area (such as the face area F) including a subject from each image frame by using a predetermined image recognizing technique, such as face detecting processing, edge detecting processing, and feature extraction processing. To put it concretely, the subject detecting section 5a performs, for example, the predetermined face detecting processing to image data of each image frame to detect the face area F.

Because the face detecting processing, the edge detecting processing, and the feature extraction processing are publicly-known techniques, their detailed descriptions are omitted here.

As described above, the subject detecting section 5a detects the subject in each of the image frames sequentially generated by the imaging section 1.

The image dividing section 5b divides image data of a subject into a plurality of first areas.

More specifically, the image dividing section 5b obtains image data of a subject area (for example, the face area F)

stored in the memory 4 and divides the obtained image data into a plurality of first areas (for example, the two first areas Al and Ar on the left and right areas of the face, respectively). To put it concretely, the image dividing section 5b obtains image data of the face area F stored in the memory 4 after the subject detecting section 5a detects the face. Then, the image dividing section 5b divides the face image in the face area F with a line segment passing through the center of the left and right eyes vertically, and sets the two rectangular first areas Al and Ar (see FIG. 5B) which are on the left and right areas of the face image in the face area F respectively. The first areas Al and Ar are within the area of the face image in the face area F, and the total of first areas Al and Ar covers a major part of the face image in the face area F.

The aforesaid direction in which image data of a subject is divided, and the aforesaid number of first areas into which the face image in the face area F is divided are only examples, and are not limited to the ones mentioned above. For example, the face may be divided into a plurality of first areas of the upper part and the lower part (for example, into an upper area around the eyes and a lower area around the mouth), or may be divided into three or more areas (for example, into a right area around the left cheek, a middle area around the nose, a left area around the right cheek, and the like). Moreover, the shape of each of the first areas into which the face is divided is merely an example, and the shapes of the first areas are not limited to the ones described above. The shapes can arbitrarily be changed suitably.

As described above, image dividing section 5b divides the image data of the subject stored in the memory 4 into a plurality of first areas.

The characteristic value calculating section 5c calculates a characteristic value (for example, average pixel values Fl and Fr) of the first areas (for example, the left and right areas Al and Ar) into which the face image in the face area F is divided by the image dividing section 5b. To put it concretely, the characteristic value calculating section 5c calculates the average pixel values Fl and Fr of the luminance signal Y and color-difference signals Cb and Cr (YUV data) of each of the left and right areas Al and Ar of the face, for example, as the characteristic values.

Moreover, the characteristic value calculating section 5c calculates the characteristic value (for example, an average pixel value Fi) of each of the second areas corresponding to each first area, wherein the second areas are specified by the area specifying section 5d, described below. To put it concretely, the characteristic value calculating section 5c calculates, for example, the average pixel value Fi of the luminance signal Y and color-difference signals Cb and Cr (YUV data) of each of the second areas as the characteristic value.

As described above, the characteristic value calculating section 5c calculates the average pixel value (first average pixel value) of each first area into which image data is divided by the image dividing section 5b and the average pixel value (second average pixel value) of each of the second areas specified by the area specifying section 5d.

Although the average pixel value of the luminance signal Y and color-difference signals Cb and Cr (YUV data) of each area is illustrated as the characteristic value, the average pixel value is only an example, and the characteristic value is not limited to the average pixel value. The characteristic value can arbitrarily be changed suitably.

The area specifying section 5d specifies the second areas corresponding to each of the first areas into which the face image in the face area F is divided by the image dividing section 5b in each of the image frames sequentially generated by the imaging section 1.

More specifically, the area specifying section 5d specifies the second areas corresponding to each first area in each of the image frames sequentially generated by the imaging section 1, on the basis of the characteristic value (for example, the average pixel values Fl and Fr) of each first area (for example, the left and right areas Al and Ar of a face) calculated by the characteristic value calculating section 5c. To put it concretely, the area specifying section 5d, for example, sets a predetermined search range in the vicinity of the position of each of the first areas Al and Ar (the left and right areas of a face), in each of the image frames sequentially generated by the imaging section 1, with the position of each first area (for example, the coordinates of the four corners of a rectangle) set as a reference. Then, the area specifying section 5d performs scanning within the set search range into predetermined directions with the characteristic value (average pixel values Fl and Fr) of each first area being as a template, and thereby specifies the second areas corresponding to each first area. At this time, although the area specifying section 5d is configured to specify a plurality of second areas corresponding to each of the two first areas Al and Ar (for example, the left and right areas) of a face in each of the image frames sequentially generated by the imaging section 1, the number of the second areas may be one.

Moreover, the area specifying section 5d calculates the positions of specified second areas respectively (for example, the coordinates of the four corners of a rectangle).

As described above, the area specifying section 5d specifies second areas similar to one of the first areas, wherein the second areas are included in each of the image frames sequentially generated by the imaging section 1, based on a characteristic value of one of the first areas into which the image data of the subject is divided by the image dividing section 5b.

The similarity calculating section 5e compares the average pixel value Fi of each of the second areas calculated by the characteristic value calculating section 5c after the second areas are specified by the area specifying section 5d, with each of the average pixel values Fl and Fr of each first area (for example, the left and right areas Al and Ar of a face), into which the face image in the face area F is divided by the image dividing section 5b, wherein the average pixel values Fl and Fr are calculated by the characteristic value calculating section 5c. Then, the similarity calculating section 5e calculates similarities DLi and DRi. To put it concretely, the similarity calculating section 5e compares the average pixel value Fi of the luminance signal Y and color-difference signals Cb and Cr of each second area specified by the area specifying section 5d, with each of the average pixel values Fl and Fr of the luminance signal Y and color-difference signals Cb and Cr of each first area (for example, the left and right areas Al and Ar of a face) into which the face image in the face area F is divided by the image dividing section 5b. Then, the similarity calculating section 5e calculates the similarities DLi and DRi in conformity with a predetermined arithmetic expression. As the arithmetic expression to calculate the similarities DLi and DRi, any expression may be applied.

As described above, the similarity calculating section 5e calculates a similarity of each second area to each of the first areas, based on the average pixel values Fl and Fr (first average pixel value) and the average pixel value Fi (second average pixel value) calculated by the characteristic value calculating section 5c.

The area designating section 5f designates a candidate area to be tracked by the subject tracking section 5h.

To put it concretely, the area designating section 5f selects the larger one of the value of the similarity DLi and that of the similarity DRi and sets the selected value as the similarity Di, of each of the second areas specified by the area specifying section 5d. Then, the area designating section 5f judges whether the similarity Di is equal to or more than a first threshold value (first predetermined value) or not. Then, the area designating section 5f designates the second areas each of which has the similarity Di equal to or more than the first threshold value as track candidate areas to be tracked by the subject tracking section 5h.

As described above, the area designating section 5f designates the second areas each of which has the similarity equal to or more than a first threshold value (first predetermined value), wherein the similarity is calculated by the similarity calculating section 5e, as track candidate areas to be tracked by the subject tracking section 5h.

The counting section 5g counts the number N of the second areas each of which has the similarities Di calculated by the similarity calculating section 5e, wherein the similarity Di is equal to or more than the first threshold value (first predetermined value). More specifically, the counting section 5g counts the number N of the second areas each of which has the similarity Di equal to or more than the first threshold value, wherein the second areas are designated as the track candidate areas by the area designating section 5f among the plurality of second areas specified by the area specifying section 5d.

As described above, the counting section 5g counts the number N of the second areas each of which has the similarity equal to or more than the first threshold value (first predetermined value), wherein the similarity is calculated by the similarity calculating section 5e, among the second areas specified by the area specifying section 5d.

The subject tracking section 5h tracks an image area determined based on the second areas specified by the area specifying section 5d as subjects to be tracked in each of the image frames sequentially generated by the imaging section 1.

More specifically, the subject tracking section 5h specifies the image area determined based on the second areas in each image frame, on the basis of the second areas specified by the area specifying section 5d when no subject area (for example, the face area F) is detected by the subject detecting section 5a. To put it concretely, the subject tracking section 5h specifies the image area determined based on the second areas to be tracked in each image frame, on the basis of the track candidate areas designated by the area designating section 5f, that is, the second areas each of which has the similarity Di equal to or more than the first threshold value among the second areas specified by the area specifying section 5d.

Furthermore, the subject tracking section 5h judges whether the number N of the second areas each of which has the similarity Di equal to or more than the first threshold value is equal to or more than the second threshold value (second predetermined value), wherein the number N is counted by the counting section 5g.

Then, when the number N of the second areas is equal to or more than the second threshold value (second predetermined value), the subject tracking section 5h calculates the weighted average of the positions (for example, the coordinates of the four corners of a rectangle), which are calculated by the area specifying section 5d, of the respective second areas, according to the similarity Di of each of the second areas and specifies the tracking result area corresponding to the average position G.

After that, when the size of the tracking result area at the average position G is different from the size of the area to be tracked (for example, the face area F), the subject tracking section 5h corrects the size of the tracking result area so that the size thereof may be equal to the size of the area to be tracked. More specifically, for example, when the size of the tracking result area is smaller than that of the area to be tracked, the subject tracking section 5h sets the tracking result area to be a wider range over again in order that the wider range may contain the whole specified tracking result area, and in order that the size of the tracking result area and that of the area to be tracked may be equal to each other. On the other hand, when the size of the tracking result area is larger than that of the area to be tracked, the subject tracking section 5h performs cropping of the tracking result area around the center thereof in order that the size of the tracking result area may be equal to that of the area to be tracked. The aforesaid method of correcting the tracking result area is only an example, and the correction method is not limited to the one described above. The aforesaid method can arbitrarily be changed suitably.

The subject tracking section 5h hereby calculates the image area (tracking result area after the correction) determined based on the second areas specified by the area specifying section 5d, and tracks the image area as the area to be tracked in each image frame.

Although the subject tracking section 5h is configured to track the image area determined on the basis of the second areas, which are counted by the counting section 5g, when the number N of the second areas is equal to or more than the second threshold value (second predetermined value), the method of tracking the image area is not limited to the one mentioned above, and the method may be the following one: specifying one second area by the area specifying section 5d and calculating the image area on the basis of the second area to track the image area.

Moreover, although the subject tracking section 5h is configured to calculate the image area determined based on the second areas on the basis of the similarities DLi and DRi between the average pixel value Fi of each of the second areas and each of the average pixel values Fl and Fr of each first area of the subject area, respectively, wherein the pixel values are calculated by the similarity calculating section 5e, and to set the image area as the area to be tracked, the aforesaid determination method of the tracking object is only one example, and the determination method is not limited to the aforesaid one. The aforesaid determination method can arbitrarily be changed suitably. That is, the subject tracking section 5h may use any method as long as the method is the one capable of determining the image area, as the area to be tracked, wherein the image area is determined based on the second areas, which are specified by the area specifying section 5d, in each image frame.

As described above, the subject tracking section 5h tracks an image area in each of the image frames sequentially generated, wherein the image area is determined based on the second areas specified by the area specifying section 5d.

The cropping section 5i crops the image data imaged by the imaging section 1 to obtain a focus area brought into focus by the automatic focusing processing (AF) by the imaging control section 2 as a subject image. More specifically, the cropping section 5i obtains the image data of an image after being imaged by the imaging section 1 from the memory 4, and crops the image data to obtain the image area (image area determined based on the second areas at the average position G) as the subject image in the image, wherein the image area is the subject to be tracked by the subject tracking section 5h,. The cropped subject image is coded and compressed by a predetermined coding system, and after that, the coded subject image is stored in a predetermined storage area in a recording medium M under the control of the recording medium control section 6.

As described above, the cropping section 5i crops the image area brought into focus by the imaging section 1.

The recording medium control section 6 is configured in such a way that the recording medium M is attachable and detachable against the recording medium control section 6, and controls the reading-out of data from the installed recording medium M and the writing of data into the recording medium M.

The recording medium M is composed of, for example, a nonvolatile memory (flash memory). However, the nonvolatile memory is only one example, and the recording medium M is not limited to the nonvolatile memory and can arbitrarily be changed suitably.

The display control section 7 performs the control of reading out image data for display which is temporarily stored in the memory 4 to make the display section 8 display the read-out image data.

To put it concretely, the display control section 7 includes a video random access memory (VRAM), a VRAM controller, a digital video encoder, and the like. The digital video encoder periodically reads out the luminance signal Y and the color-difference signals Cb and Cr, which are read out from the memory 4 and are stored in the VRAM (not shown), through the VRAM controller, and generates a video signal on the basis of these pieces of data to output the generated video signal to the display section 8, under the control of the central processing section 10.

The display section 8 is, for example, a liquid crystal display panel, and displays an image and the like imaged by the electronic imaging section on the display screen thereof on the basis of a video signal from the display control section 7. To put it concretely, the display section 8 displays a live view image while sequentially updating a plurality of image frames generated by imaging of a subject by the imaging section 1 and the imaging control section 2 at a predetermined frame rate in an imaging mode for a still image or a moving image. Moreover, the display section 8 displays an image (RecView image) to be recorded as a still image, and displays an image under recording as a moving image.

The operation inputting section 9 is a section for performing predetermined operations of the imaging apparatus 100. To put it concretely, the operation inputting section 9 includes a shutter button for an instruction to image a subject; a selection determining button for a selection and determination of an imaging mode, a function, and the like; a zoom button for an instruction to adjust a zoom quantity; and the like (all not shown). The operation inputting section 9 outputs a predetermined operation signal to the central processing section 10 according to an operation of those buttons.

The central processing section 10 is a section for controlling each section of the imaging apparatus 100. To put it concretely, the central processing section 10 includes a central processing unit (CPU) and the like (not shown), and performs various control operations in accordance with various processing programs (not shown) for the imaging apparatus 100.

Next, main processing of the imaging apparatus 100 is described with reference to FIG. 2.

Figure 2:
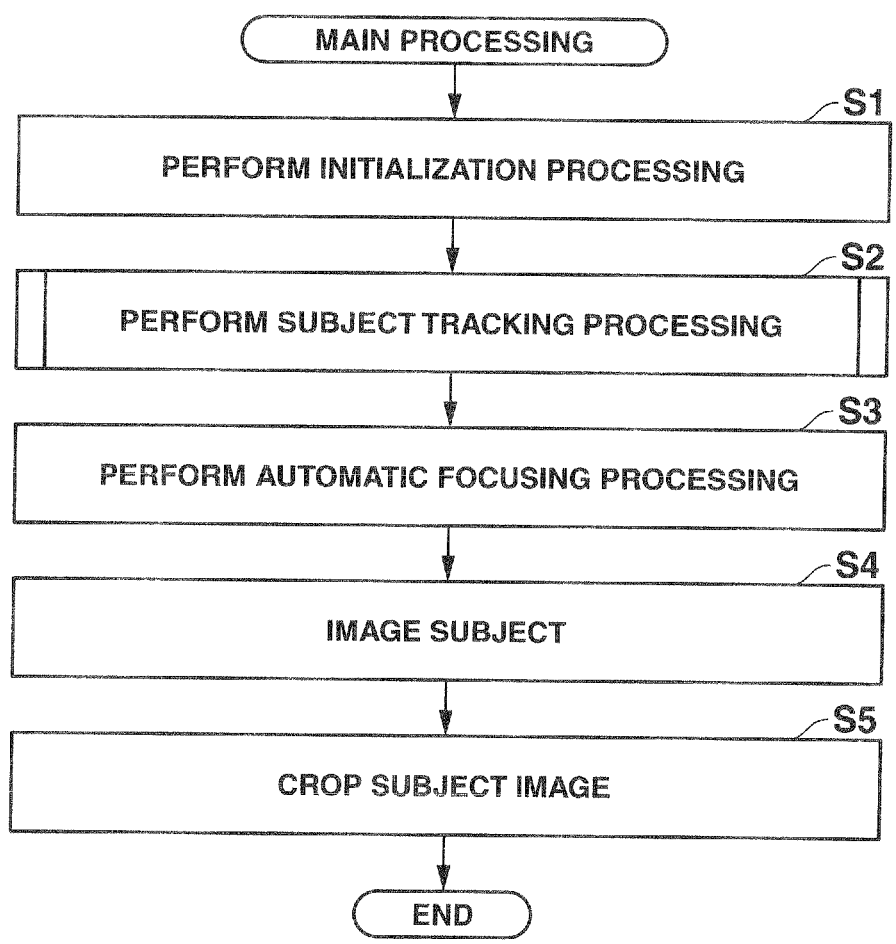
FIG. 2 is a flow chart showing an example of the operation of main processing of the imaging apparatus of FIG. 1.

FIG. 2 is a flow chart showing an example of the operation of the main processing.

The main processing is the processing executed by the central processing section 10 when an imaging mode for a still image or a moving image is selected among a plurality of operation modes displayed on a menu screen on the basis of a predetermined operation of the selection determining button of the operation inputting section 9 by a user.

First, the central processing section 10 performs initialization processing for initializing a count value stored in the memory 4 (Step S1), and after that, the central processing section 10 makes the image processing section 5 perform subject tracking processing (see FIGS. 3 and 4; described below) for tracking a subject among a plurality of images imaged by the imaging section 1 (Step S2).

After that, the central processing section 10 makes the imaging control section 2 execute automatic focusing processing (AF) according to a result of the subject tracking processing (Step S3). To put it concretely, the imaging control section 2 sets a subject to be tracked by the subject tracking section 5h, that is, the face area F in an image frame or an image area (tracking result area; described below) determined based on second areas corresponding to each of the two first areas Al and Ar (for example, the left and right areas) into which the face image in the face area F is divided by the image dividing section 5b, as a focus area. Then, the imaging control section 2 adjusts the focus position of the focus lens by making the focusing drive section of the imaging section 1 move the focus lens into the optical axis direction thereof so as to bring the focus area into focus.

The automatic focusing processing (AF) may be executed on the basis of a halfway pressing operation of the shutter button in the operation inputting section 9 by a user, or may be executed automatically after the execution of the subject tracking processing regardless of whether the shutter button is operated or not.

Next, when an imaging instruction is input into the central processing section 10 on the basis of a predetermined operation of the shutter button of the operation inputting section 9 by a user, the central processing section 10 controls the imaging control section 2 to make the imaging section 1 image a subject (Step S4). To put it concretely, the imaging control section 2 makes the electronic imaging section image an optical image of a subject under a predetermined imaging condition, and the image data generating section 3 generates the YUV data of the imaged image of the subject transferred from the electronic imaging section. The generated YUV data is transferred in a manner of DMA transfer to the memory 4, which is used as a buffer memory, through a not-shown DMA controller.

Next, the central processing section 10 makes the cropping section 5i of the image processing section 5 execute the cropping of the subject image (Step S5). To put it concretely, the cropping section 5i obtains the image data of an image after being imaged by the imaging section 1 from the memory 4, and crops the image data to obtain the image area (face area F), as a subject image, which is a subject to be tracked by the subject tracking section 5h.

The central processing section 10 hereby ends the main processing.

The subject tracking processing is described with reference to FIGS. 3-5B.

Figure 3:
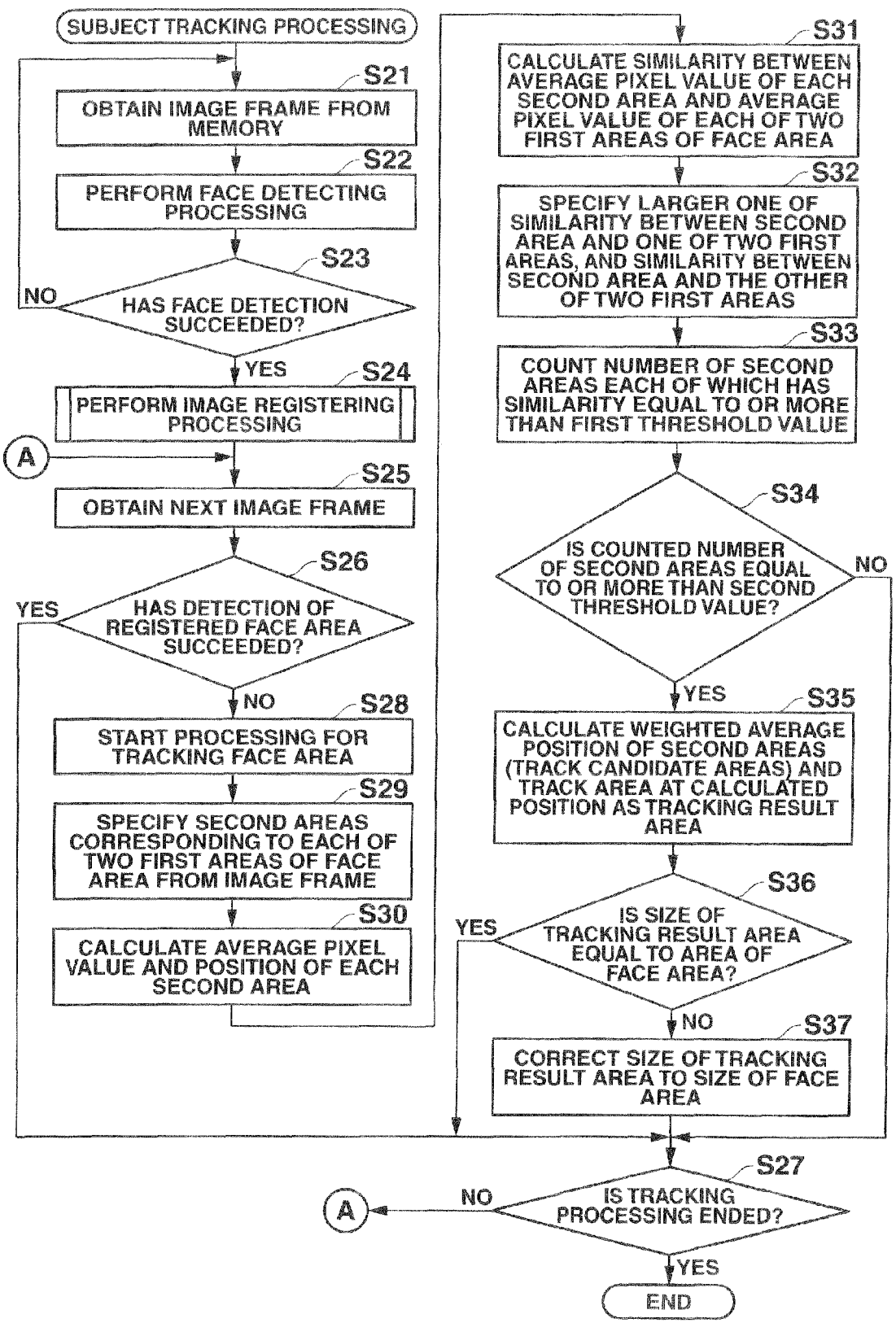
FIG. 3 is a flow chart showing an example of the operation of subject tracking processing in the main processing of FIG. 2.
Figure 4:
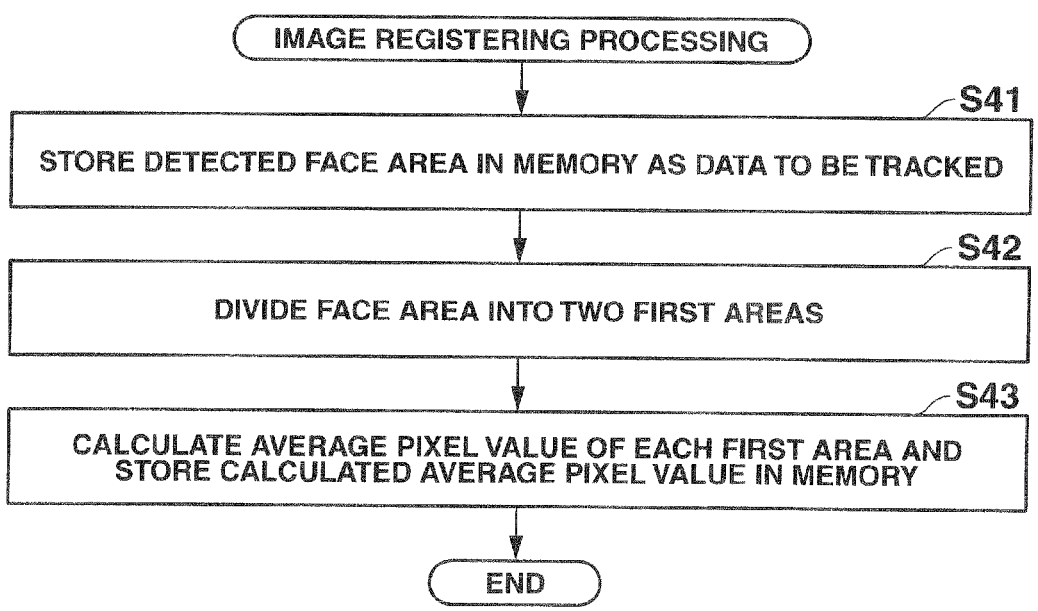
FIG. 4 is a flow chart showing an example of the operation of image registering processing in the subject tracking processing of FIG. 3.
Figure 5A:
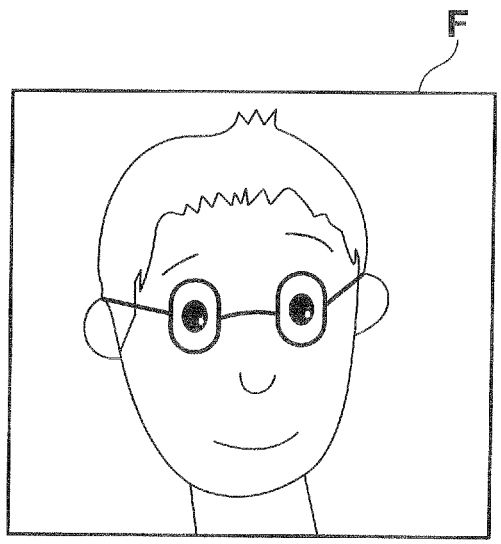
FIGS. 5A and 5B are views schematically showing an example of a face image which is used to explain the subject tracking processing of FIG. 3.
Figure 5B:
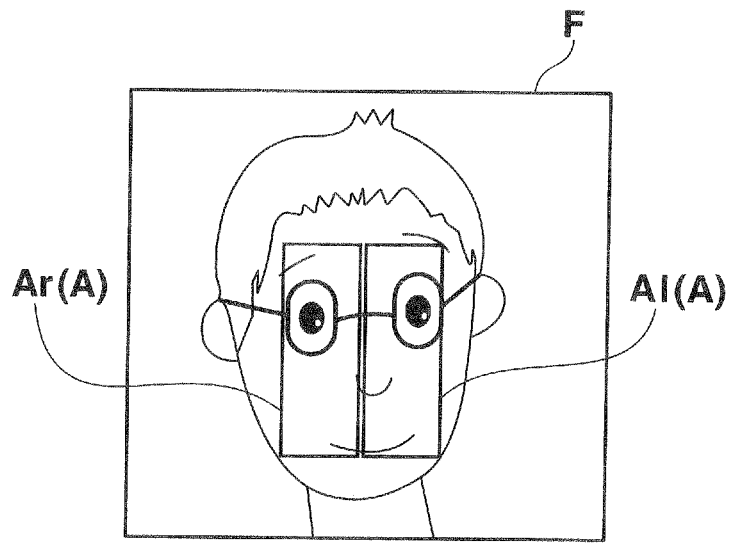

FIG. 3 is a flow chart showing an example of the operation of the subject tracking processing. FIG. 4 is a flow chart showing an example of the operation of the image registering processing in the subject tracking processing. FIGS. 5A and 5B are views schematically showing an example of a face image which are used to explain the subject tracking processing, and in particular, FIG. 5B is a view schematically showing a state in which the face image to be tracked is divided into first areas Al and Ar, i.e. the left and right areas, respectively.

The subject to be detected and tracked in the subject tracking processing is a person's face here. Moreover, although the image data of a face image of a desired person (for example, a face image of one of a family or a friend; see FIG. 5A) is preliminarily registered into a predetermined registration table (not shown) of the memory 4, it can arbitrarily be changed suitably whether the image data of a face image is preliminarily registered or not.

As shown in FIG. 3, the subject detecting section 5a of the image processing section 5 obtains the image data (YUV data) of an image frame generated by imaging of a subject by the imaging section 1 from the memory 4 (Step S21). After that, the subject detecting section 5a detects the face area F (see FIG. 5A) including a face image registered in the memory 4 in advance, from the image frame, by the use of a predetermined image recognizing technique, such as the face detecting processing (Step S22).

Next, the subject detecting section 5a judges whether the detection of the face area F has succeeded or not according to the result of the face detecting processing (Step S23).

If it is judged that the detection of the face area F has not succeeded (Step S23: No), the subject detecting section 5a moves the processing to Step S21, and obtains the image data (YUV data) of an image frame from the memory 4 over again (Step S21), following which the subject detecting section 5a executes the processing after that.

On the other hand, if it is judged that the detection of the face area F has succeeded at Step S23 (Step S23: Yes), the image processing section 5 executes the image registering processing for registering the detected face area F as a subject to be tracked (Step S24; see FIG. 4).

In the following, the image registering processing is described with reference to FIG. 4.

As shown in FIG. 4, the image processing section 5 first crops the image data of the face area F detected by the subject detecting section 5a with the cropping section 5i, and stores the image data of the face area F in the predetermined storage area of the memory 4, as the data to be tracked (Step S41).

Next, the image dividing section 5b of the image processing section 5 obtains the image data of the face area F stored in the memory 4, divides the face image in the face area F with a line segment passing through the center of the left and right eyes vertically, and sets two rectangular areas in the left and right areas respectively (see FIG. 5B) which are within the area of the face image in the face area F, and the total of the two areas covers a major part of the face image in the face area F. (Step S42).

After that, the characteristic value calculating section 5c of the image processing section 5 calculates the average pixel values Fl and Fr of the luminance signal Y and color-difference signals Cb and Cr (YUV data) of the two first areas Al and Ar, respectively, into which the face image in the face area F is divided by the image dividing section 5b, as characteristic values. Next, the characteristic value calculating section 5c store the calculated average pixel values Fl and Fr of the two respective first areas Al and Ar in a predetermined storage area of the memory 4 (Step S43), and ends the image registering processing.

As shown in FIG. 3, the subject detecting section 5a of the image processing section 5 next sets the image frame, next to the image frame including the face area F resisted by the image registering processing, as the image frame to be processed, and obtains the image data of the image frame from the memory 4, among the pieces of image data of the plurality of respective image frames generated by imaging of the subject by the imaging section 1 (Step S25). Next, the subject detecting section 5a performs the face detecting processing for detecting the face area F (see FIG. 5A) in the image frame, wherein the face area F is preliminarily resisted in the memory 4 by the image registering processing, and judges whether the detection of the face area F has succeeded or not according to the result of the face detecting processing (Step S26).

If it is judged that the detection of the face area F has succeeded at Step S26 (Step S26: Yes), the image processing section 5 judges whether the ending of the subject tracking processing is instructed or not according to, for example, whether automatic focusing processing or imaging processing is executed or not (Step S27).

If it is judged that the ending of the subject tracking processing is not instructed (Step S27: No), the image processing section 5 moves the processing to Step S25, and moves the image frame to be processed in the subject tracking processing to the next image frame and obtains the image data of the next image frame from the memory 4 (Step S25). After that, the image processing section 5 executes the processing after that.

On the other hand, if it is judged that the ending of the subject tracking processing is instructed at Step S27 (Step S27: Yes), the image processing section 5 ends the subject tracking processing.

If it is judged that the detection of the face area F has not succeeded at Step S26 (Step S26: No), that is, if the detection of the face area F has failed because a subject turns to another way in an angle of view—for example, a face turns around, turns up, or the like—or because there is a shadow on the face, then the image processing section 5 starts the processing for tracking the face area of the subject (Step S28). The area specifying section 5d of the image processing section 5 specifies the second areas corresponding to each of the two first areas Al and Ar (for example, the left and right areas) of the face in the image frame to be processed, on the basis of the average pixel values Fl and Fr of the two respective first areas Al and Ar calculated by the characteristic value calculating section 5c (Step S29).

Next, the area specifying section 5d calculates the position (for example, the coordinates of the four corners of a rectangle) of each specified second area, and the characteristic value calculating section 5c calculates the average pixel value Fi of the luminance signal Y and color-difference signals Cb and Cr (YUV data) of each second area, as a characteristic value (Step S30).

Next, the similarity calculating section 5e of the image processing section 5 compares the calculated average pixel value Fi of the luminance signal Y and the color-difference signals Cb and Cr of each second area with each of the average pixel values Fl and Fr of each of the luminance signal Y and the color-difference signals Cb and Cr of the two first areas Al and Ar of the face, respectively, to calculate the similarities DLi and DRi in conformity with a predetermined arithmetic expression (Step S31). Next, the area designating section 5f of the image processing section 5 selects the larger one of the value of the similarity DLi and that of the similarity DRi and specifies the selected value as the similarity Di (Step S32).

Next, the area designating section 5f judges whether each of the specified similarities Di is equal to or more than the first threshold value (first predetermined value) or not, and after that, the counting section 5g counts the number N of the second areas, whose similarity Di is judged to be equal to or more than the first threshold value (first predetermined value) by the area designating section 5f (Step S33).

Next, the subject tracking section 5h of the image processing section 5 judges whether the number N of the second areas, whose similarity Di is judged to be equal to or more than the first threshold value, counted by the counting section 5g is equal to or more than the second threshold value (second predetermined value) or not (Step S34).

If it is judged that the number N of the second areas is equal to or more than the second threshold value (second predetermined value) (Step S34: Yes), the subject tracking section 5h calculates the weighted averaging of the positions (for example, the coordinates of the four corners of a rectangle) of the second areas according to the similarity Di, the positions calculated by the area specifying section 5d, and tracks the area as the tracking result area corresponding to the average position G (Step S35).

Next, the subject tracking section 5h judges whether the size of the tracking result area at the average position G is equal to the size of the face area F to be tracked or not (Step S36).

If it is judged that the size of the tracking result area at the average position G is different from the size of the face area F to be tracked (Step S36: No), the subject tracking section 5h corrects the tracking result area so that the size thereof may be equal to the size of the face area F.

On the other hand, if it is judged that the size of the tracking result area at the average position G is equal to the size of the face area F to be tracked (Step S36: Yes), the subject tracking section 5h skips the processing at Step S37 and judges whether the ending of the subject tracking processing is instructed or not (Step S27).

Moreover, if it is judged that the number N of the second areas is not equal to or more than the second threshold value (second predetermined value) at Step S34 (Step S34: No), the subject tracking section 5h moves the processing to Step S27, and judges whether the ending of the subject tracking processing is instructed or not (Step S27) without performing the tracking of the face area F at Step S35.

If it is judged that the ending of the subject tracking processing is not instructed (Step S27: No), the image processing section 5 moves the processing to Step S25 similarly to the procedure mentioned above, and moves the image frame to be processed in the subject tracking processing to the next image frame to obtain the image data of the next image frame from the memory 4 (Step S25). After that, the image processing section 5 executes the processing after that.

On the other hand, if it is judged that the ending of the subject tracking processing is instructed at Step S27 (Step S27: Yes), the image processing section 5 ends the subject tracking processing.

As described above, according to the imaging apparatus 100 of the first embodiment, the image data of the subject area (for example, the face area F) stored in the memory 4 is divided into a plurality of first areas. After that, the imaging apparatus 100 specifies the second areas corresponding to each first area of each image frame sequentially generated by the imaging section 1, on the basis of the characteristic value of each first area into which the subject area is divided. Then, the imaging apparatus 100 tracks the image area determined based on the second areas in each image frame, as the area to be tracked. More specifically, the imaging apparatus 100 specifies each of the plurality of first areas into which the subject area, i.e. the area to be tracked, is divided, in each image frame imaged by the imaging section 1. Consequently, the imaging apparatus 100 can use a part area of the subject area (area to be tracked), in which there are little changes of contrast, for subject detection even if the contrast changes at the time of the subject detecting processing because a subject turns to another way in an angle of view—for example a face turns around, turns up, or the like—or because there is an influence of a shadow when the subject enters a shadow, for example. Furthermore, the abovementioned processing in the imaging apparatus 100 makes it possible to suppress a fall of the accuracy of subject detection more effectively than in the case of using the whole subject area as the area to be tracked. As a result, the accuracy in tracking a subject among a plurality of image frames can hereby improves.

To put it concretely, the imaging apparatus 100 calculates the similarity Di by comparing the average pixel values Fl and Fr of the respective first areas into which the subject area is divided, with the average pixel value Fi of each of the specified second areas. Then, the imaging apparatus 100 specifies an image area to be tracked in each image frame by setting the second areas, whose similarity Di is equal to or more than the first threshold value, as track candidate areas to be tracked, and tracks the specified image area. Thus, the imaging apparatus 100 uses the similarity Di between the average pixel values Fl and Fr of the respective first areas of the subject area and the average pixel value Fi of each second area, as a standard, and consequently the designation of track candidate areas can appropriately be performed.

To put it more concretely, the imaging apparatus 100 specifies a plurality of second areas corresponding to each of the first areas in each image frame, and when the number N of the second areas, each of which has the similarity Di equal to or more than the first threshold value, is equal to or more than the second threshold value, the imaging apparatus 100 tracks the image area as the area to be tracked which is determined on the basis of the second areas. Consequently, even in the case of tracking a subject by dividing the subject area thereof into a plurality of first areas, the imaging apparatus 100 can prevent the error in specifying the area to be tracked and offer the accuracy in tracking a subject.

if a subject is detected in each image frame sequentially generated by the imaging section 1, the imaging apparatus 100 can perform the ordinary subject tracking processing by setting the subject as the subject to be tracked. Moreover, if no subject is detected in each image frame sequentially generated by the imaging section 1, the imaging apparatus 100 sets an image area determined based on second areas corresponding to each first area in each image frame as an area to be tracked and tracks the image area. Therefore, even if no subject can be detected in each image frame, the imaging apparatus 100 can offer the accuracy in tracking a subject.

Moreover, because the imaging apparatus 100 controls the imaging section 1 so as to bring the area to be tracked (image area) of a subject in each image frame into focus, the imaging apparatus 100 can adjust the focus to the subject. Furthermore, because the imaging apparatus 100 crops the image data to obtain the in-focus image area as a subject image, the imaging apparatus 100 can use the subject image in each processing after that, such as the subject tracking processing.

[Second Embodiment]

In the following, an imaging apparatus 200 of a second embodiment is described with reference to FIGS. 6-10C.

The imaging apparatus 200 of the second embodiment divides the image data of a subject into a plurality of first areas in a plurality of predetermined division modes. After that, the imaging apparatus 200 specifies a division mode in which a difference between the characteristic values (for example, average pixel values) of the respective first areas is the largest, the values being calculated for each of the first areas into which the image data of the subject is divided for each of the plurality of division modes. The imaging apparatus 200 specifies the second areas on the basis of the characteristic value of each of the plurality of first areas into which the image data of the subject is divided in the division mode in which the difference is the largest.

The imaging apparatus 200 of the second embodiment has almost the same configuration as that of the imaging apparatus 100 of the first embodiment except for what is described in detail in the following, and therefore, the detailed description of the construction common to the imaging apparatus 100 and 200 is omitted.

FIG. 6 is a block diagram showing the schematic configuration of the imaging apparatus 200 of the second embodiment to which the present invention is applied.

As shown in FIG. 6, the image processing section 5 of the imaging apparatus 200 includes a division control section 5j, a difference calculating section 5k, and a division mode determining section 5l in addition to the subject detecting section 5a, the image dividing section 5b, the characteristic value calculating section 5c, the area specifying section 5d, the similarity calculating section 5e, the area designating section 5f, the counting section 5g, the subject tracking section 5h, and the cropping section 5i.

The division control section 5j controls the division of image data of a subject by the image dividing section 5b.

More specifically, the division control section 5j makes the image dividing section 5b divide image data of a subject into a plurality of first areas in a plurality of division modes (see FIGS. 7A-7R). To put it concretely, the division control section 5j makes the image dividing section 5b obtain the image data of the face area F stored in the memory 4 after the detection of the face by the subject detecting section 5a. Next, the division control section 5j makes the image dividing section 5b divide the face image in the face area F with a line segment passing through the center between the left and right eyes vertically to set two rectangular first areas A1 and A2 (see FIG. 7A) which are within the area of the face image in the face area F, and the total of first areas A1 and A2 covers a major part of the face image in the face area F.

The division control section 5j sets the set two first areas A1 and A2 as reference areas corresponding to a reference position (for example, 0°), and rotates the two first areas A1 and A2 around almost the center position of the reference areas as an axis by the predetermined angle (for example, 10°) into a predetermined direction (for example, right direction). Thereby, the division control section 5j sets the two first areas A1 and A2 corresponding to each angle (see FIGS. 7B-7R). The division control section 5j sets the two first areas A1 and A2 into which the face image in the face area F is divided in a plurality of division modes (for example, 18 patterns) by rotating the reference areas up to a predetermined angle (for example, 170°) to the reference position. FIGS. 7A-7R schematically show only the part of the face image in the face area F.

Moreover, the aforesaid method for dividing the image data of the subject is only an example, and the method is not limited to the aforesaid one. The method can arbitrarily be changed suitably. For example, the division control section 5j may set a line segment passing through the center between the left and right eyes of the face image in the face area F vertically as a reference line segment, rotate the line segment around almost the center position of the face area F as an axis by the predetermined angle into a predetermined direction, divide the face image in the face area F with the line segment at each angle, and set the two first areas A1 and A2 corresponding to each angle.

Furthermore, instead of rotating the reference areas and the reference line segment by the predetermined angle, by storing predetermined angles to the reference areas and the reference line segment in the storage section in advance as the angles at which the image data of a subject is divided, the division control section 5j may make the image dividing section 5b divide the image data of the subject on the basis of the predetermined angles to the reference areas and the reference line segment, wherein the angles are stored in the storage section.

The angles at which the image data of the subject is divided, the rotation directions of the reference areas and the reference line segment, and the like, are only examples, and those are not limited to the disclosed ones. The angles, the rotation directions, and the like can arbitrarily be changed suitably.

As described above, the division control section 5j makes the image dividing section 5b divide the image data of the subject into the first areas in a plurality of predetermined division modes.

The difference calculating section 5k calculates the difference Ri between the characteristic values of a plurality of respective first areas into which the face image in the face area F is divided for each of the plurality of division modes.

To put it concretely, the characteristic value calculating section 5c calculates the characteristic values (for example, average pixel values F1 and F2) of each of a plurality of first areas, respectively, (for example, two first areas A1 and A2) into which the face image in the face area F is divided by the image dividing section 5b for each of the plurality of division modes (for example, 18 patterns). The concrete method for calculating the characteristic value is almost the same as that of the first embodiment, and the detailed description thereof is omitted.

The difference calculating section 5k calculates each of the difference Ri between the characteristic values of the plurality of respective first areas into which the face image in the face area F is divided for each of the plurality of division modes on the basis of the characteristic values in conformity with a predetermined arithmetic expression. To put it concretely, the difference calculating section 5k calculates the difference between the average pixel values F1 and F2 of the two respective first areas A1 and A2, respectively, for each of the plurality of division modes, and calculates the absolute value of the calculated difference as the difference Ri. Any expression may be used as the arithmetic expression to calculate the difference Ri.

As described above, the difference calculating section 5k calculates a difference between the pixel values (for example, average pixel values) of the respective first areas into which the image data of the subject is divided under the control of the division control section 5j for each of the plurality of division modes.

The division mode determining section 5l determines the division mode in which the difference Ri is the largest among the plurality of division modes.

More specifically, the division mode determining section 5l compares the differences Ri of the plurality of respective division modes which are calculated by the difference calculating section 5k, to each other, to determine the division mode in which the difference Ri is the largest.

The magnitude of the difference Ri changes owing to the influence of a shadow, that is, owing to the influence of the shadow generated in accordance with the position of the subject (face) to a light source. More specifically, when the light source is situated at a predetermined position to the subject, the brightness (contrast) of a half of the subject is different from that of the other half with an orthogonal line segment in between as a boundary, wherein the orthogonal line segment is almost perpendicular to a line segment connecting the light source and almost the center of the subject, and wherein the orthogonal line segment passes through almost the center of the subject. The difference Ri between the characteristic values (for example, the average pixel values F1 and F2) of the two respective first areas A1 and A2 is the largest when the image data is divided by the orthogonal line segment.

Figure 9A:
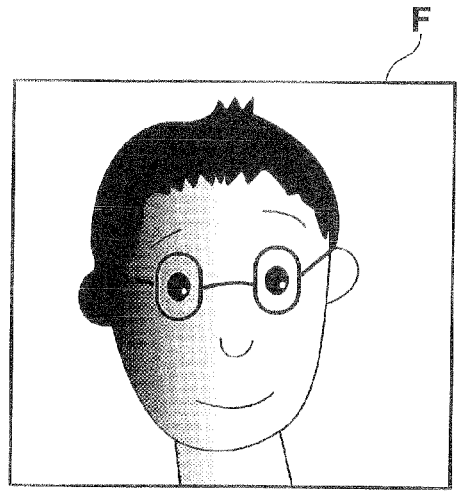
FIGS. 9A, 9B, and 9C are views schematically showing examples of face images which are used to explain the image registering processing of FIG. 8.
Figure 9B:
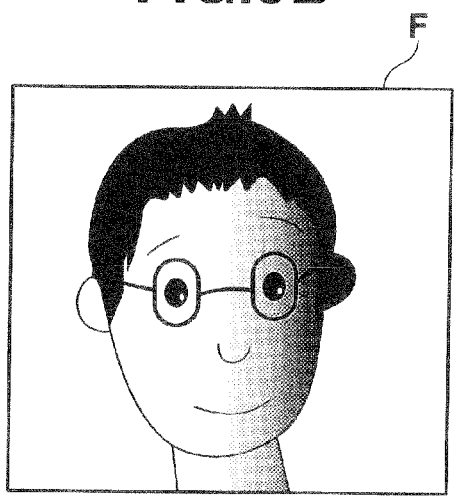
Figure 9C:
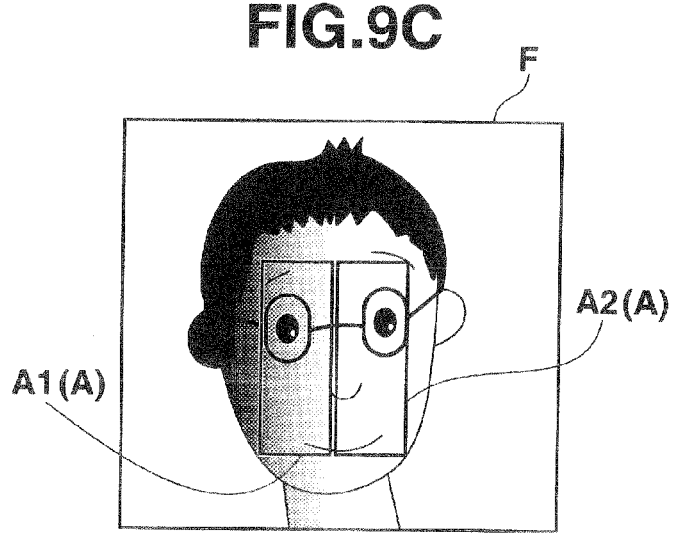
Figure 10A:
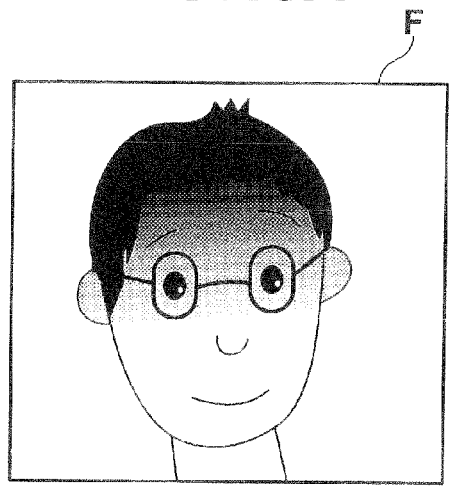
FIGS. 10A, 10B, and 10C are views schematically showing examples of face images which are used to explain the image registering processing of FIG. 8.
Figure 10B:
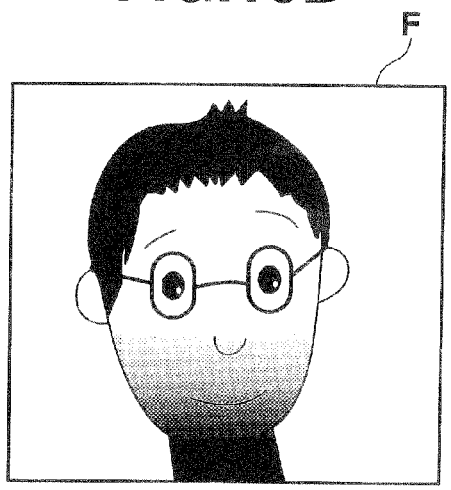
Figure 10C:
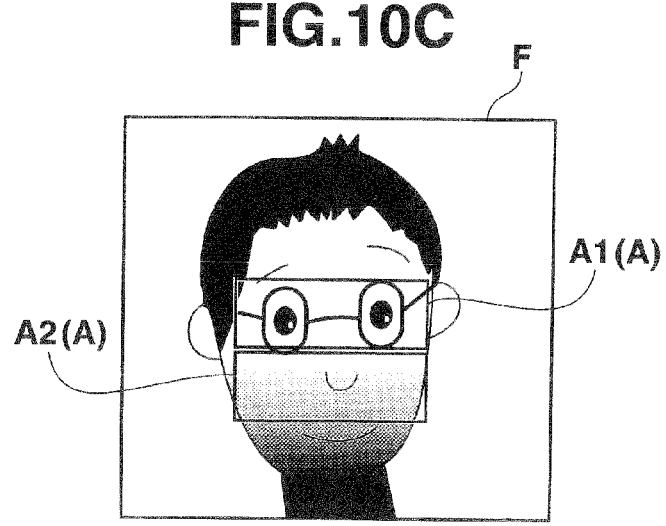

For example, when the light source is situated in the left or right direction of a subject (face), the brightness of the left part of the face image in the face area F is different from the brightness of right part thereof (see FIGS. 9A and 9B). Hence, the difference Ri between the characteristic values of the two respective first areas A1 and A2 (see FIG. 9C) is the largest when the face image in the face area F is divided into the left and right areas. Moreover, for example, when a light source is situated in an upper or lower direction of a subject (face), the brightness of the upper part of the face image in the face area F is different from the brightness of the lower part thereof (see FIGS. 10A and 10B). Hence, the difference Ri between the characteristic values of the two respective first areas A1 and A2 (see FIG. 10C) is the largest when the face image in the face area F is divided into the upper and lower areas. Moreover, when a light source is situated in a diagonal direction to a subject (face), the situation is similar to those of the above-mentioned cases.

In FIGS. 9A-9C and FIGS. 10A-10C, face images are schematically shown by indicating a part which is illuminated with a light in "white," and indicating a shaded part in "black."

As described above, the division mode determining section 5*l* determines a division mode in which the difference Ri is the largest among the plurality of division modes in which the difference Ri is calculated by the difference calculating section 5*k*.

Then, the area specifying section 5*d* specifies the second areas corresponding to each of the plurality of first areas (for example, the two first areas A1 and A2) into which the face image in the face area F is divided in the division mode in which the difference Ri is the largest, wherein the division mode is determined by the division mode determining section 5*l*, on the basis of the characteristic value (for example, the average pixel value F1 and F2) of each of the plurality of areas.

The concrete method of specifying the second areas by the area specifying section 5*d* is almost the same as that of the first embodiment, and accordingly the detailed description thereof is omitted.

Next, subject tracking processing is described with reference to FIG. 3 and FIGS. 8-10C.

Figure 8:
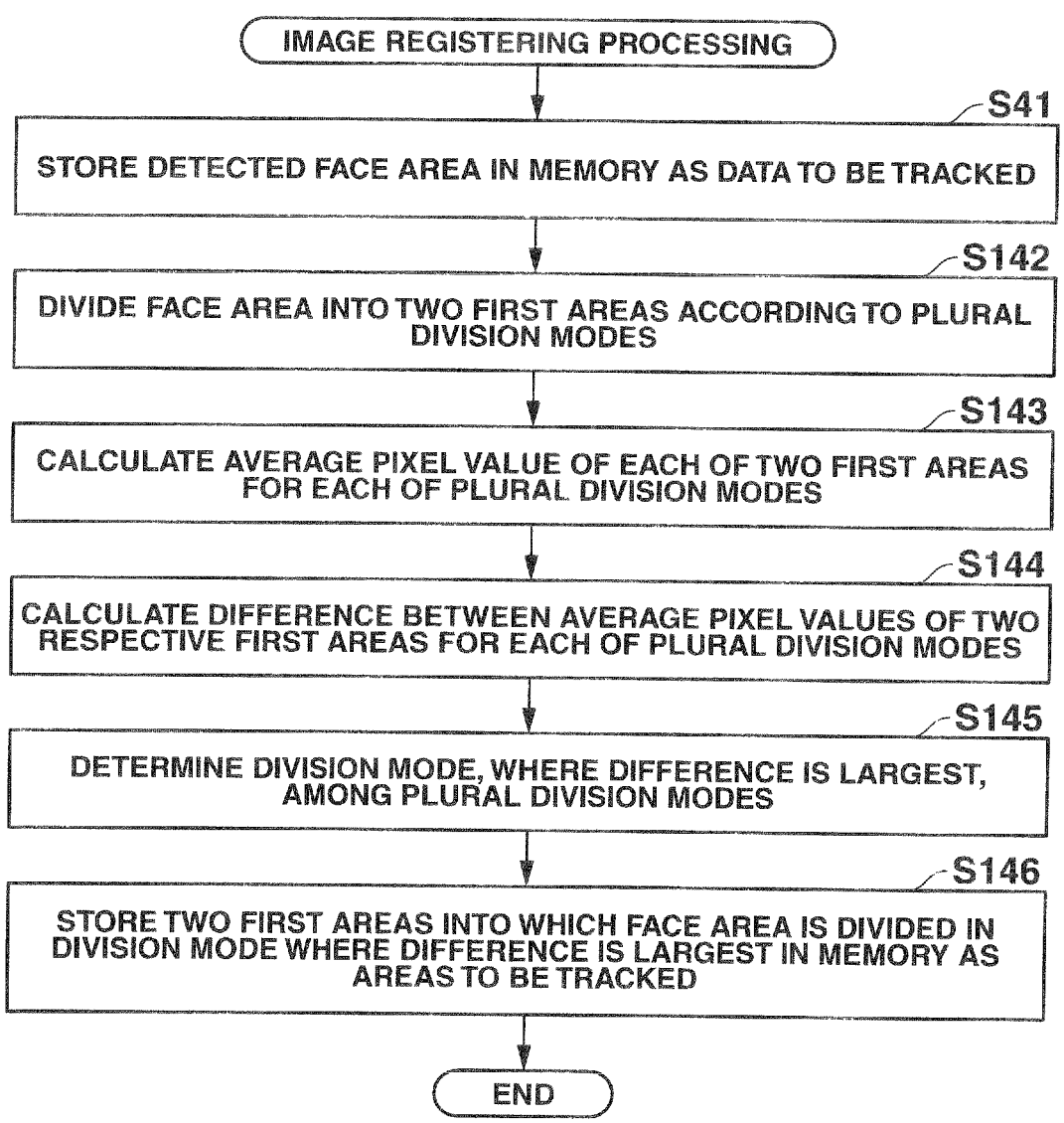
FIG. 8 is a flow chart showing an example of the operation of image registering processing in subject tracking processing by the imaging apparatus of FIG. 6.

FIG. 8 is a flow chart showing an example of the operation of image registering processing in subject tracking processing.

All the processing in the subject tracking processing except the image registering processing which is described in the following is almost the same as that of the first embodiment, and therefore the detailed description thereof is omitted.

The subject tracking processing is the processing to be executed as one of the main processing similarly to the subject tracking processing of the first embodiment.

More specifically, in the subject tracking processing, similarly to that of the first embodiment, as shown in FIG. 3, the subject detecting section 5*a* obtains the image data (YUV data), from the memory 4, of an image frame generated by imaging of a subject by the imaging section 1 (Step S21). After that, the subject detecting section 5*a* detects the face area F (see FIG. 5A) including a face image registered in the memory 4 in advance from the image frame by the use of the predetermined image recognizing technique, such as the face detecting processing (Step S22).

Next, similarly to the subject tracking processing of the first embodiment, the subject detecting section 5*a* judges whether the detection of the face area F has succeeded or not according to the result of the face detecting processing (Step S23).

If it is judged that the detection of the face area F has succeeded (Step S23: Yes), the image processing section 5 executes the image registering processing for registering the detected face area F as an area to be tracked (Step S24; see FIG. 8).

In the following, the image registering processing is described with reference to FIG. 8.

As shown in FIG. 8, similarly to the image registering processing of the first embodiment, the image processing section 5 performs cropping to obtain the image data of the face area F detected by the subject detecting section 5*a* with the cropping section 5*i*, and stores the obtained image data of the face area F in the predetermined storage area of the memory 4 as the data to be tracked (Step S41).

Next, the image processing section 5 divides the face image in the face area F according to each of the plurality of division modes into the two first areas A1 and A2 (Step S142). To put it concretely, similarly to the image registering processing of the first embodiment, the image dividing section 5*b* obtains the image data of the face area F stored in the memory 4, following which the division control section 5*j* makes the image dividing section 5*b* divide the face image in the face area F with a line segment passing through the center between the left and right eyes vertically to set the two rectangular first areas A1 and A2 (see FIG. 7A) in the face image in face area F. Then, the division control section 5*j* rotates the rectangular first areas A1 and A2 into a predetermined direction (for example, right direction) by the predetermined angle (for example, 10°) around almost the center position of the set two first areas A1 and A2 as reference areas, as an axis. Then, the division control section 5*j* sets the two first areas A1 and A2 corresponding to each angle (see FIGS. 7A-7R).

Next, the characteristic value calculating section 5*c* calculates the average pixel values F1 and F2, as characteristic values, of the luminance signal Y and color-difference signals Cb and Cr (YUV data) in the two respective first areas A1 and A2 into which the face image in the face area F is divided by the image dividing section 5*b* for each of the plurality of division modes (for example, 18 patterns) (Step S143). Moreover, the characteristic value calculating section 5*c* stores the calculated average pixel values F1 and F2 of the two respective first areas A1 and A2, for each of the plurality of division modes (for example, 18 patterns) in a predetermined storage area of the memory 4.

Next, the difference calculating section 5*k* calculates the difference Ri between the average pixel values F1 and F2 of the two respective first areas A1 and A2, into which the face image in the face area F is divided, on the basis of the average pixel values F1 and F2 of the two respective first areas A1 and A2 in conformity with a predetermined arithmetic expression, for each of the plurality of division modes (Step S144). To put it concretely, the difference calculating section 5*k* obtains the average pixel values F1 and F2 of the two respective first areas A1 and A2, respectively, from the memory 4, for each of the plurality of division modes. Then, the difference calculating section 5*k* calculates the difference between the average pixel values F1 and F2, and calculates the absolute value of the difference as the difference Ri.

Then, the division mode determining section 5*l* compares the differences Ri in the plurality of division modes calculated by the difference calculating section 5*k*, to each other, to determine the division mode in which the difference Ri is the largest (Step S145). For example, if a light source is situated in a left or right direction of a subject (face), then the difference Ri between the characteristic values (for example, average pixel values F1 and F2) of the two respective first areas A1 and A2 (see FIG. 9C) is the largest when the face image in the face area F is divided into the left and right areas (first areas A1 and A2). Hence, the division mode determining section 5l sets the division mode, in which the face image in the face area F is divided into the left and right areas, as the division mode in which the difference Ri is the largest. Similarly, for example, if the light source is situated in the upper or lower direction of the subject (face), then the difference Ri between the characteristic values (for example, average pixel values F1 and F2) of the two respective first areas A1 and A2 (see FIG. 10C) is the largest when the face image in the face area F is divided into the upper and lower areas (first areas A1 and A2). Accordingly, the division mode determining section 5l sets the division mode, in which the face image in the face area F is divided into the upper and lower areas, as the division mode in which the difference Ri is the largest.

After that, the image processing section 5 stores the average pixel values F1 and F2 of the two respective first areas A1 and A2 into which the face image in the face area F is divided in the division mode in which the difference Ri is the largest, wherein the division mode is determined by the division mode determining section 5l, as the area to be tracked in the processing for tracking the face area of the subject, in the predetermined storage area of the memory 4 (Step S146), and the image processing section 5 ends the image registering processing.

Returning to FIG. 3, the image processing section 5 executes the processing after Step S25 similarly to the subject tracking processing of the first embodiment.

More specifically, at Step S25, the subject detecting section 5a obtains the image data of the image frame to be processed from the memory 4, and after that, the subject detecting section 5a judges whether the detection of the face area F has succeeded or not at Step S26.

If it is judged that the detection of the face area F has not succeeded (Step S26: No), then the image processing section 5 starts the processing for tracking the face area of the subject (Step S28). The area specifying section 5d then specifies the second areas corresponding to each of the two first areas A1 and Ar of the face in the image frame to be processed, on the basis of the average pixel values F1 and F2 of the two respective first areas A1 and Ar of the face, into which the face image in the face area F is divided in the division mode in which the difference Ri is the largest, wherein the average pixel values F1 and F2 are calculated by the characteristic value calculating section 5c (Step S29).

After that, at Step S30, the area specifying section 5d calculates the positions of the specified second areas, and the characteristic value calculating section 5c calculates the average pixel value Fi of the luminance signal Y and color-difference signals Cb and Cr (YUV data) of each second area as the characteristic value.

Then, at Step S31, the similarity calculating section 5e compares the calculated average pixel value Fi of the luminance signal Y and the color-difference signals Cb and Cr of each second area, with the average pixel values Fl and Fr of each of the luminance signal Y and the color-difference signals Cb and Cr of the two respective first areas A1 and Ar of the face, into which the face image in the face area F is divided in the division mode in which the difference Ri is the largest, and calculates the similarities D1i and D2i in conformity with a predetermined arithmetic expression.

Next, at Step S32, the area designating section 5f selects the larger one of the value of the similarity D1i and that of the similarity D2i of the respective second areas and specifies the selected value as the similarity Di (Step S32).

The processing after Step S33 is similar to the subject tracking processing of the first embodiment, and therefore, the detailed description thereof is omitted.

As described above, the imaging apparatus 200 of the second embodiment specifies the division mode in which the difference Ri between the characteristic values of a plurality of respective first areas is the largest, among a plurality of division modes. After that, the image apparatus 200 specifies the second areas on the basis of the characteristic value of each of the plurality of first areas into which the face image in the face area F is divided in the division mode in which the difference Ri is the largest. Thereby, the imaging apparatus 200 tracks the imaging area determined based on the second areas in each image frame as the area to be tracked. This configuration makes it possible to prevent the following problem: depending on some position of a subject (for example, a face) to a light source, the subject may be influenced by a shadow, in which case, subject tracking is easily subject to the influence of a shadow, and thereby, the accuracy in tracking a subject is reduced, if each of the plurality of first areas pertaining to the specification of the second areas are set in such a way that the first areas spread (extend) over an area in which contrast changes are large.

The imaging apparatus 200 sets a plurality of first areas into which the image data of a subject area is divided in such a way that the difference Ri between the characteristic values of the plurality of respective first areas may be the largest. Thereby, the plurality of first areas can be prevented from spreading (extending) over an area in which contrast changes are large. As a result, the accuracy in tracking a subject in a plurality of image frames can improve.

The present invention is not limited to the embodiments described above, but various improvements and changes of the designs may be performed without departing from the sprit and scope of the present invention.

For example, although the embodiments described above are each configured to perform the subject tracking processing on the basis of the face area F stored in the memory 4 after the detection of the face area F by the subject detecting section 5a at the time of imaging the subject, the face area F can be obtained in another way. For example, the image data of a subject to be used as a reference may be previously registered in the memory 4 before the start of the imaging of the subject.

Moreover, although the first and second embodiments are each configured to execute the automatic focusing processing (AF) and the cropping processing after the subject tracking processing, these pieces of processing are not necessarily need to be performed. It is arbitrarily changed suitably whether the pieces of processing are executed or not.

Furthermore, although the first and second embodiments described above are configured to specify second areas and track a subject by using each of the first areas into which the subject area (face area F) is divided by the image dividing section 5b as a template, the area used as a template is not limited to each of the first areas. For example, a characteristic area (for example, the left and right eyes, the wings of the nose, or the corners of the mouth in the case in which the face image in the face area F is divided into left and right areas) may be specified in each of the first areas into which the face image in the face area F is divided, and the specification of second areas and the tracking of a subject may be performed by using each of the characteristic areas as a template.

Furthermore, the configurations of the imaging apparatus 100 and 200 described in the first and second embodiments, respectively, are only examples, and the configurations are not limited to those ones. For example, although the imaging apparatus 100 and 200 are illustrated as the subject tracking apparatus, the subject tracking apparatus is not limited those ones. The subject tracking apparatus having any configuration may be used as long as the subject tracking apparatus can execute the predetermined image processing according to the present invention.

In addition, although the first and second embodiments described above are configured to realize the functions of the division section, the imaging section, the specification section, and the tracking section by the driving of the imaging control section 2 and the image processing section 5 under the control of the central processing section 10, the realization of the functions are not limited to the above described one. The functions may be realized by the configuration where the central processing section 10 executes predetermined programs or the like.

More specifically, a program including a division processing routine, an imaging control processing routine, a specification processing routine, and a track processing routine is stored in a program memory (not shown) for storing programs. The CPU of the central processing section 10 may function as a division section which divides the image data of the subject stored in the storage section into a plurality of first areas in conformity with the division processing routine. Moreover, the CPU of the central processing section 10 may function as an imaging control section which sequentially generates image frames in conformity with the imaging control processing routine. Moreover, the CPU of the central processing section 10 may function as a specification section which specifies a second area similar to one of the first areas, the second area included in each of the image frames sequentially generated, based on a characteristic value of one of the first areas into which the image data of the subject is divided by the division section in conformity with the specification processing routine. Moreover, the CPU of the central processing section 10 may function as a tracking section which tracks an image area in each of the image frames determined based on the second area specified by the specification section in conformity with the track processing routine.

Similarly, the functions of the pixel value calculation section, the similarity calculation section, the designation section, the count section, the detection section, the control section, the cropping section, the division control section, the difference calculation section, and the determination section may be realized by the configuration where the CPU of the central processing section 10 executes predetermined programs or the like.

Furthermore, it is also possible to use a nonvolatile memory such as a flash memory and a portable recording medium such as a CD-ROM, besides a read-only memory (ROM), a hard disk, and the like, as a computer-readable medium which stores the programs for executing each processing described above. Moreover, a carrier wave is also applicable as a medium for providing the data of the programs through a predetermined communication line.

Although some of the embodiments of the present invention have been described, the scope of the invention is not limited to the embodiments described above. The scope of the invention covers the scope of the claims including the equivalent thereof.

In the following, the invention in the claims originally attached to the request of this application is appended. The numbers of the respective appended claims are the same as those of the claims originally attached to the request of the application.

The entire disclosures of Japanese Patent Application No. 2010-107928 filed on May 10, 2010 and Japanese Patent Application No. 2011-035595 filed on Feb. 22, 2011 including description, claims, drawings, and abstract are incorporated herein by reference in its entirety.

Although various exemplary embodiments have been shown and described, the invention is not limited to the embodiments shown. Therefore, the scope of the invention is intended to be limited solely by the scope of the claims that follow.

What is claimed is:

1. A subject tracking apparatus comprising:
an image acquisition section that sequentially acquires image frames;
a detection section that detects, from the acquired image frames, image data of a subject which is a partial area in at least one of the acquired image frames;
a division section that divides the detected image data of the subject into a plurality of first areas;
a specification section that specifies, based on a characteristic value of at least one of the first areas, a second area which is similar to at least one of the first areas and which is included in the acquired image frames; and
a tracking section that tracks an image area as the subject in the acquired image frames;
wherein the specification section comprises:
a pixel value calculation section that calculates a first representative pixel value of one of the first areas and a second representative pixel value of the second area;
a similarity calculation section that calculates a similarity of the second area to one of the first areas, based on the first representative pixel value and the second representative pixel value calculated by the pixel value calculation section; and
a designation section that designates the second area which has the similarity equal to or larger than a first predetermined value, the similarity being calculated by the similarity calculation section, as a track candidate area to be tracked by the tracking section; and
wherein the tracking section tracks the image area determined based on the track candidate area designated by the designation section.

2. The subject tracking apparatus according to claim 1, further comprising:
a division control section that controls the division section to divide the image data of the subject into the first areas in a plurality of predetermined division modes;
a difference calculation section that calculates a difference between the first representative pixel values of the respective first areas into which the image data of the subject is divided by the division control section for each of the plurality of division modes; and
a determination section that determines a division mode in which the difference is the largest among the plurality of division modes in each of which the difference is calculated by the difference calculation section;
wherein the specification section specifies the second area based on the first representative pixel value of one of the first areas into which the image data of the subject is divided in the division mode in which the difference determined by the determination section is the largest.

3. The subject tracking apparatus according to claim 1, wherein:
the pixel value calculation section calculates a first average pixel value of one of the first areas as the first representative pixel value and a second average pixel value of the second area as the second representative pixel value; and the similarity calculation section calculates the similarity of the second area based on the first average pixel value and the second average pixel value calculated by the pixel value calculation section.

4. The subject tracking apparatus according to claim 1, wherein the specification section specifies a plurality of the second areas similar to one of the first areas, the second areas being included in each of the image frames sequentially acquired;
   wherein the subject tracking apparatus further comprises a count section that counts a number of the second areas having the similarity equal to or more than the first predetermined value, the similarity being calculated by the similarity calculation section, among the second areas specified by the specification section; and
   wherein the tracking section tracks the image area determined based on the second areas when the number of the second areas counted by the count section is equal to or more than a second predetermined value.

5. The subject tracking apparatus according to claim 1, further comprising a detection section that detects the subject in each of the image frames sequentially acquired by the image acquisition section, wherein the tracking section tracks the image area when the detection section does not detect the subject.

6. The subject tracking apparatus according to claim 1, further comprising an imaging control section that controls an imaging section of the subject tracking apparatus based on a tracking result obtained by the tracking section, wherein the imaging control section controls the imaging section so as to set the image area, which is to be tracked by the tracking section, as a focus area.

7. The subject tracking apparatus according to claim 6, further comprising a cropping section that crops the image area set as the focus area.

8. The subject tracking apparatus according to claim 1, further comprising a determination section that determines whether the detection section succeeds in detecting the image data of the subject, wherein the specification section begins specifying the second area when the determination section determines that the detection section has not succeeded in detecting the image data of the subject.

9. The subject tracking apparatus according to claim 1, wherein the specification section specifies the second area in the sequentially acquired image frames after an image frame including the detected image data of the subject.

10. The subject tracking apparatus according to claim 1, further comprising an imaging section that sequentially generates image frames, wherein the acquisition section acquires the image frames from the imaging section.

11. A method for tracking a subject, the method being performed by a subject tracking apparatus, and the method comprising:
   sequentially acquiring image frames;
   detecting, from the acquired image frames, image data of the subject which is a partial area in at least one of the image frames;
   dividing the detected image data of the subject into a plurality of first areas;
   specifying, based on a characteristic value of at least one of the first areas, a second area which is similar to at least one of the first areas and which is included in the acquired image frames; and
   tracking an image area as the subject in the acquired image frames;
   wherein the specifying the second area comprises:
      calculating a first representative pixel value of one of the first areas and a second representative pixel value of the second area;
      calculating a similarity of the second area to one of the first areas, based on the calculated first representative pixel value and the calculated second representative pixel value; and
      designating the second area which has the calculated similarity equal to or larger than a first predetermined value as a track candidate area to be tracked; and
   wherein the image area tracked in the tracking is determined based on the designated track candidate area.

12. A non-transitory computer-readable recording medium storing a computer program thereon for a subject tracking apparatus, the computer program enabling a computer of the subject tracking apparatus to function as:
   an image acquisition section that sequentially acquires image frames;
   a detection section that detects, from the acquired image frames, image data of a subject which is a partial area in at least one of the acquired image frames;
   a division section that divides the detected image data of the subject into a plurality of first areas;
   a specification section that specifies, based on a characteristic value of at least one of the first areas, a second area which is similar to at least one of the first areas and which is included in the acquired image frames; and
   a tracking section that tracks an image area as the subject in the acquired image frames;
   wherein the specification section comprises:
      a pixel value calculation section that calculates a first representative pixel value of one of the first areas and a second representative pixel value of the second area;
      a similarity calculation section that calculates a similarity of the second area to one of the first areas, based on the first representative pixel value and the second representative pixel value calculated by the pixel value calculation section; and
      a designation section that designates the second area which has the similarity equal to or larger than a first predetermined value, the similarity being calculated by the similarity calculation section, as a track candidate area to be tracked by the tracking section; and
   wherein the tracking section tracks the image area determined based on the track candidate area designated by the designation section.

* * * * *